United States Patent
Saito et al.

(10) Patent No.: US 7,571,652 B2
(45) Date of Patent: Aug. 11, 2009

(54) PRESSURE SENSOR APPARATUS AND PRESSURE SENSOR HOUSING

(75) Inventors: Kazunori Saito, Matsumoto (JP);
Kimihiro Ashino, Matsumoto (JP);
Katsumichi Ueyanagi, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 0 days.

(21) Appl. No.: 11/939,077

(22) Filed: Nov. 13, 2007

(65) Prior Publication Data
US 2008/0110273 A1 May 15, 2008

(30) Foreign Application Priority Data
Nov. 10, 2006 (JP) .............................. 2006-305261

(51) Int. Cl.
*G01L 7/00* (2006.01)
(52) U.S. Cl. .......................................... 73/756; 73/708
(58) Field of Classification Search .................. 73/706, 73/708, 715, 753, 756
See application file for complete search history.

(56) References Cited

U.S. PATENT DOCUMENTS

| | | | |
|---|---|---|---|
| 4,420,738 A | 12/1983 | Rehmann et al. | |
| 4,843,882 A | 7/1989 | Ohta et al. | |
| 5,693,879 A * | 12/1997 | Rilling et al. | 73/114.34 |
| 6,003,379 A * | 12/1999 | Ichikawa et al. | 73/708 |
| 6,253,606 B1 * | 7/2001 | Yonezawa et al. | 73/204.26 |
| 6,272,913 B1 | 8/2001 | Naegele et al. | |
| 6,308,574 B1 | 10/2001 | Klün et al. | |
| 6,604,430 B2 | 8/2003 | Saito et al. | |
| 6,820,479 B2 * | 11/2004 | Roeckel et al. | 73/202.5 |
| 6,896,002 B2 * | 5/2005 | Hart et al. | 137/625.5 |
| 6,962,081 B2 * | 11/2005 | Ueyanagi et al. | 73/514.18 |

(Continued)

FOREIGN PATENT DOCUMENTS

DE 198 16 872 A1 10/1999

(Continued)

OTHER PUBLICATIONS

Related co-pending U.S. Appl. No. 11/937,950, filed on Nov. 9, 2007 including the Specification, pp. 1-17; Claims 1-13 on pp. 18-21; Abstract, p. 22; and Drawings, Figs 1-10.

(Continued)

*Primary Examiner*—Lisa M Caputo
*Assistant Examiner*—Freddie Kirkland, III
(74) *Attorney, Agent, or Firm*—Rossi, Kimms & McDowell, LLP

(57) ABSTRACT

A pressure sensor apparatus and a pressure sensor housing are provided that are capable of preventing the occurrence of frozen moisture, swelling of a gel-like coating member and damage of a pressure sensor element without accumulating moisture, oil, gasoline or the like on a protective wall even when the pressure sensor apparatus is disposed obliquely. The protective wall prevents entry of foreign matter into the pressure detection chamber, or a pressure sensor housing of the pressure sensor apparatus. The protective wall has an inclined surface that is provided with an angle $\theta_{8a}$ in which a second angle $\theta_2$ is acquired between a horizontal line HL and the inclined surface that slopes downward when the pressure sensor apparatus is disposed obliquely by a first angle $\theta_1$ with respect to the horizontal line HL.

11 Claims, 7 Drawing Sheets

U.S. PATENT DOCUMENTS

| | | |
|---|---|---|
| 6,971,269 B2 | 12/2005 | Nomura |
| 7,104,136 B2 | 9/2006 | Akiyama et al. |
| 7,216,546 B2 * | 5/2007 | Hayashi et al. ............... 73/708 |
| 7,260,992 B2 | 8/2007 | Hayashi et al. |
| 7,412,894 B2 * | 8/2008 | Ueyanagi et al. .............. 73/753 |
| 2002/0144554 A1 * | 10/2002 | Ueyanagi et al. .............. 73/700 |
| 2003/0037610 A1 | 2/2003 | Roeckel et al. |
| 2005/0268723 A1 | 12/2005 | Akiyama et al. |
| 2008/0110268 A1 * | 5/2008 | Saito et al. .................... 73/708 |

FOREIGN PATENT DOCUMENTS

| | | |
|---|---|---|
| GB | 2179161 A | 2/1987 |
| JP | 2002-310836 A | 10/2002 |
| JP | 2005-345412 A | 12/2005 |

OTHER PUBLICATIONS

Extended European search report, dated Sep. 2, 2008, issued in EP application No. 07021766.6-1236 which corresponds to related co-pending U.S. Appl. No. 11/937,950; 7 pages.

Extended European Search Report dated Feb. 5, 2009, issued in corresponding European Application No. 07021765.8-1236/ 1921433.

* cited by examiner

PRESSURE SENSOR APPARATUS AND PRESSURE SENSOR HOUSING

CROSS REFERENCE TO RELATED APPLICATION

The present application claims priority from Japanese Patent Application 2006-305261 filed Nov. 10, 2006, the contents of which are incorporated herein by reference.

BACKGROUND OF THE INVENTION

The present invention relates to a pressure sensor apparatus having a pressure sensor element for measuring the pressure of a gas, and a pressure sensor housing for containing the pressure sensor element.

An example of a pressure sensor apparatus that is set up in an intake manifold of a vehicle and measures the pressure of air in the manifold is shown in FIG. 7 through FIG. 9. FIG. 7 is a plan view of a pressure sensor apparatus 100, FIG. 8 is a cross-sectional view taken along a line B-B of FIG. 7, and FIG. 9 is a perspective view of a pressure sensor housing 100' formed by removing a pressure sensor element 201 and a sensor mount portion 202 from the pressure sensor apparatus 100 shown in FIG. 8.

As shown in FIG. 8, a pressure detection chamber 102 is formed in a substantially central part of a sensor housing main body 101, and a pressure inlet 103 communicating with a lower portion of the pressure detection chamber 102. Reference numeral 104 represents a pressure introducing pipe that has the pressure inlet 103 at the center. The pressure introducing pipe 104 is inserted into the intake manifold (not shown) such that a seating surface 109 of the sensor housing main body 101 contacts with the intake manifold. The pressure introducing pipe 104 introduces the air inside the intake manifold from the pressure inlet 103 to the pressure detection chamber 102. A gasket 111 is provided on the pressure introducing pipe 104 to prevent air from leaking out of the manifold during engine operation. Reference numeral 107 shown in FIG. 7 through FIG. 9 is a mounting hole for fixing the pressure sensor apparatus 100 to the intake manifold by a screw, bolt or some other mechanical fastener.

Furthermore, reference numeral 201 represents a pressure sensor element composed of a semiconductor, and this pressure sensor element 201 is mounted in the sensor mount portion 202 and disposed above the pressure detection chamber 102. The pressure sensor element 201 is formed by bridge-connecting a plurality of semiconductor strain gauges formed on a diaphragm composed of single-crystal silicon or the like. When the diaphragm is deformed by a change of pressure in the pressure detection chamber 102, the resistance of the semiconductor strain gauges is changed by a piezoelectric effect in accordance with the volume of the deformation. By this principle, the pressure of the pressure detection chamber 102, which is the air pressure within the intake manifold, can be detected by detecting a voltage signal equivalent to the gauge resistance ratio.

Moreover, reference numeral 203 shown in FIG. 8 represents a lead terminal, and this lead terminal 203 is connected to the pressure sensor element 201 via a bonding wire (not shown). Also, reference numeral 204 represents another lead terminal, and this lead terminal 204 is connected to the lead terminal 203 by welding or the like. The lead terminal 204 projects toward the inside of a connector socket 105, and a connector (not shown) for extracting an output signal of the pressure sensor element 201 is attached to the connector socket 105. Reference numeral 102b represents the bottom surface of the pressure detection chamber 102. The pressure sensor element 201 and the bonding wire (not shown) are protected by a gel-like coating member, which is not shown, to protect a wiring section from being corroded by moisture, depleted oil, gasoline or the like entering from the outside.

As shown in FIG. 8 and FIG. 9, a substantially semicircular and flat protective wall 106 is provided horizontally in a protruding fashion on an inner peripheral wall of the sensor housing main body 101 that faces the pressure detection chamber 102. A top surface 113 of the protective wall 106 is in a plane that is parallel with a plane of the seating surface of the sensor housing main body 101 such that the two planes do not intersect. The protective wall 106 prevents oil, dust and other foreign matters from entering the pressure detection chamber 102 from the intake manifold side and prevents damage and contamination of the pressure sensor element 201.

Japanese Unexamined Patent Application Publication No. 2005-345412 A, its corresponding U.S. Pat. No. 7,104,136, Japanese Unexamined Patent Application Publication No. 2002-310836 A and its corresponding U.S. Pat. No. 6,604,430 each describe a conventional technology that has a mechanism for preventing entry of foreign matters into the pressure detection chamber, as with the protective wall 106 described above. In the pressure sensor apparatus according to Japanese Unexamined Patent Application Publication No. 2005-345412 A and its corresponding U.S. Pat. No. 7,104,136, a plurality of compartments are provided on a passage extending from an intake manifold to a pressure sensor element, a flat protruding portion is provided perpendicular to an inner wall of each compartment, and entry of foreign matters into a pressure detection chamber is prevented by these compartments and the projecting portion. In the pressure sensor apparatus and the pressure sensor container according to Japanese Unexamined Patent Application Publication No. 2002-310836 and its corresponding U.S. Pat. No. 6,604,430, a plurality of three-dimensional projecting portions disposed on an inner wall of the pressure introducing pipe prevent entry of foreign matters.

It is assumed that these types of pressure sensor apparatuses are normally attached to an intake manifold horizontally, as shown in FIG. 8. However, there is a case in which the pressure sensor apparatus 100 is disposed at an angle with respect to a horizontal line as shown in FIG. 10, due to the layout and the like of the intake manifold. In such a case, moisture generated by the condensation of air within the pressure detection chamber 102 or moisture that directly enters from the intake manifold is adhered to and accumulated in a space between the flat protective wall 106 and an inner peripheral wall of the pressure detection chamber 102. Reference numeral 301 shown in FIG. 10 represents the abovementioned moisture. When the moisture 301 is frozen in a low-temperature environment, there is a possibility that the diaphragm formed on the surface of the pressure sensor element 201 might be damaged or that the bonding wire might be disconnected. Also, there is a possibility that frozen ice might obstruct the introduction of air into the pressure detection chamber 102.

In addition, not only the abovementioned moisture but also oil or gasoline accumulates on a top surface of the flat protective wall 106, and the gel-like coating member coating the pressure sensor element 201 and the like swells because of the oil or gasoline, whereby a target coating effect cannot be obtained. Therefore, such disadvantages caused by the accumulation of moisture, oil, gasoline or the like in the pressure detection chamber 102 can be generated not only on the protective wall 106 but also the bottom surface 102b of the pressure detection chamber 102. Similar problems can occur in the above-mentioned references in which moisture, oil, gasoline or the like accumulates on the top surfaces of the projecting portions if the pressure sensor apparatus is disposed obliquely. It would be desirable to eliminate this accumulation to ensure proper operation of the sensor.

SUMMARY OF THE INVENTION

A pressure sensor apparatus is provided that prevents the accumulation of moisture, oil, gasoline or the like on a protective wall or a bottom surface of a pressure detection chamber, thereby preventing the moisture from being frozen and a gel-like coating member from swelling even when the pressure sensor apparatus is disposed obliquely.

The apparatus includes a sensor housing main body including a seating surface, a pressure detection chamber located within the sensor housing main body, and a protective wall protruding from the sensor housing main body into the pressure detection chamber. The protective wall has an inclined surface located in a plane that intersects with a plane in which the seating surface is located. Preferably, the inclined surface is a curved surface, although other configurations are possible. A pressure sensor element can be coupled to the sensor housing main body and located in a position to detect the pressure within the pressure detection chamber.

The sensor housing main body and the protective wall are preferably integrally formed with resin. However, the protective wall may be manufactured as a separate element and then attached to the sensor housing man body.

A second inclined surface may be formed on an inner peripheral wall of the pressure detection chamber. The second inclined surface lies in a plane that intersects the plane containing the seating surface. The plane in which the second inclined surface lies also preferably intersects the plane containing the inclined surface at a location within the pressure detection chamber. The second inclined surface may also be formed as a curved surface.

Furthermore, the protective wall is preferably provided in a protruding fashion on the pressure detection chamber side and has an inclined surface having a predetermined inclination angle. The inclination angle of this inclined surface is set to a value at which a second angle ($\theta_2$ degrees) is acquired between a horizontal line and the inclined surface that slopes downward when the pressure sensor apparatus is disposed obliquely by a first angle ($\theta_1$ degrees) with respect to the horizontal line.

The second inclined surface is formed on an inner peripheral wall of the pressure detection chamber, and the inclination angle of this inclined surface is set to a value at which a fourth angle ($\theta_4$ degrees) is acquired between the horizontal line and this inclined surface that slopes downward when the pressure sensor apparatus is disposed obliquely by a third angle ($\theta_3$ degrees) with respect to the horizontal line. It should be noted that each of the first through fourth angles may be of any size.

Moreover, characteristic configurations of the protective wall, its inclined surface, and another inclined surface formed on the inner peripheral wall of the pressure detection chamber can be directly applied to the pressure sensor housing that is formed such that the pressure sensor element can be mounted therein.

According to the pressure sensor apparatus or the pressure sensor housing of the present invention, even if it is necessary to mount the pressure sensor apparatus or pressure sensor housing obliquely because of layout limitations, the moisture adhering to the inclined surface of the protective wall slips off downward, whereby frozen moisture generated by the accumulated moisture can be prevented from occurring. Consequently, the pressure sensor element is prevented from being damaged by frozen ice and the introduction of air into the pressure detection chamber can be prevented from being obstructed by the frozen ice. Furthermore, oil or gasoline adhered to the inclined surface of the protective wall also slips off along the inclined surface, thus the gel-like coating member for coating the pressure sensor element and the like can be prevented from swelling so that the coating effect is not damaged.

Needless to say, the inclined surface of the protective wall achieves the effect of dropping and thereby removing the moisture, oil, gasoline and the like even if the pressure sensor apparatus or pressure sensor housing is disposed horizontally.

In addition, by forming another inclined surface having a predetermined inclination angle on the inner peripheral wall of the pressure detection chamber, the effect of removing the moisture, oil, gasoline and the like can be achieved, as with the inclined surface of the protective wall.

BRIEF DESCRIPTION OF THE DRAWINGS

The invention will be described with reference to certain preferred embodiments and the accompanying drawings, wherein.

DETAILED DESCRIPTION OF THE PREFERRED EMBODIMENTS

Figure 1:
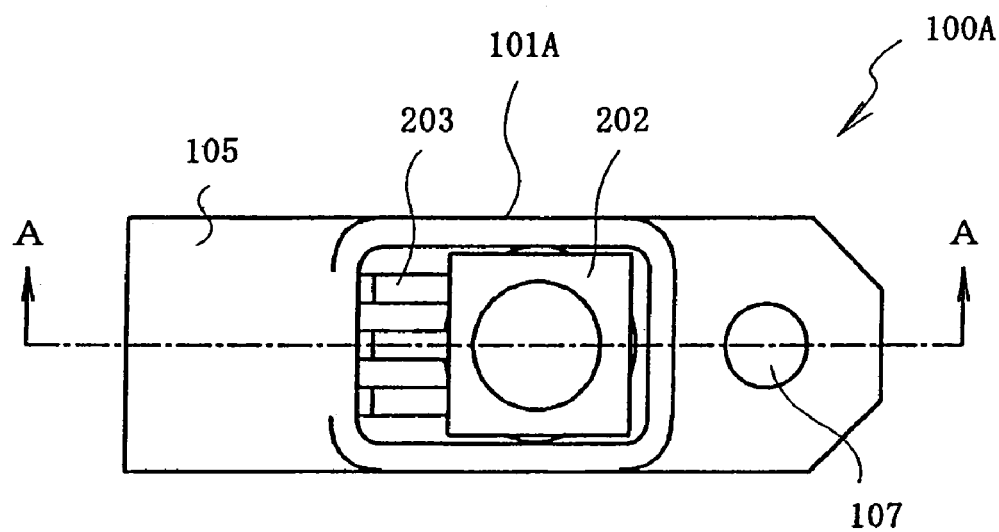
FIG. 1 is a plan view of a pressure sensor apparatus according to an embodiment.
Figure 2:
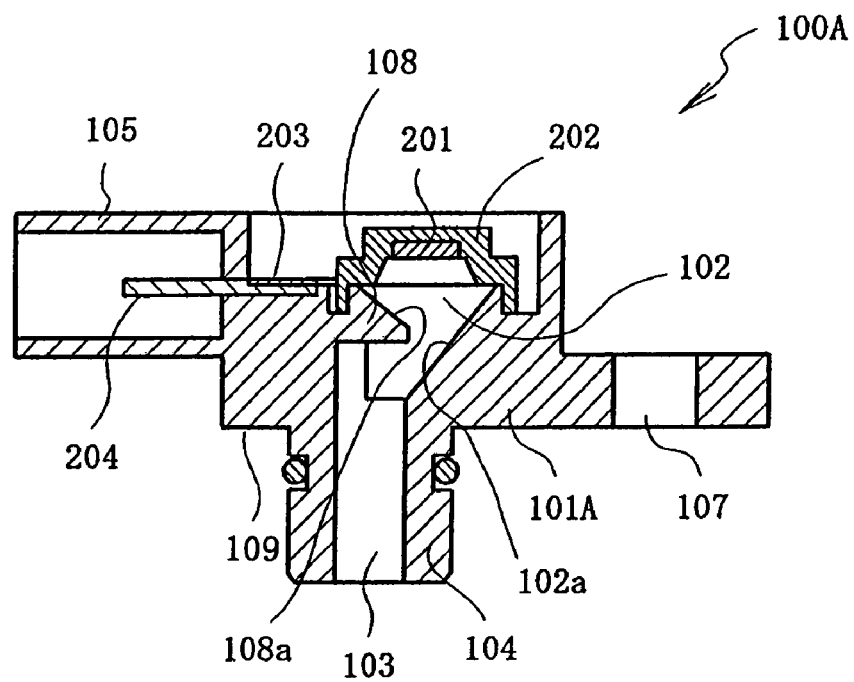
FIG. 2 is a cross-sectional view taken along a line A-A of FIG. 1.
Figure 3:
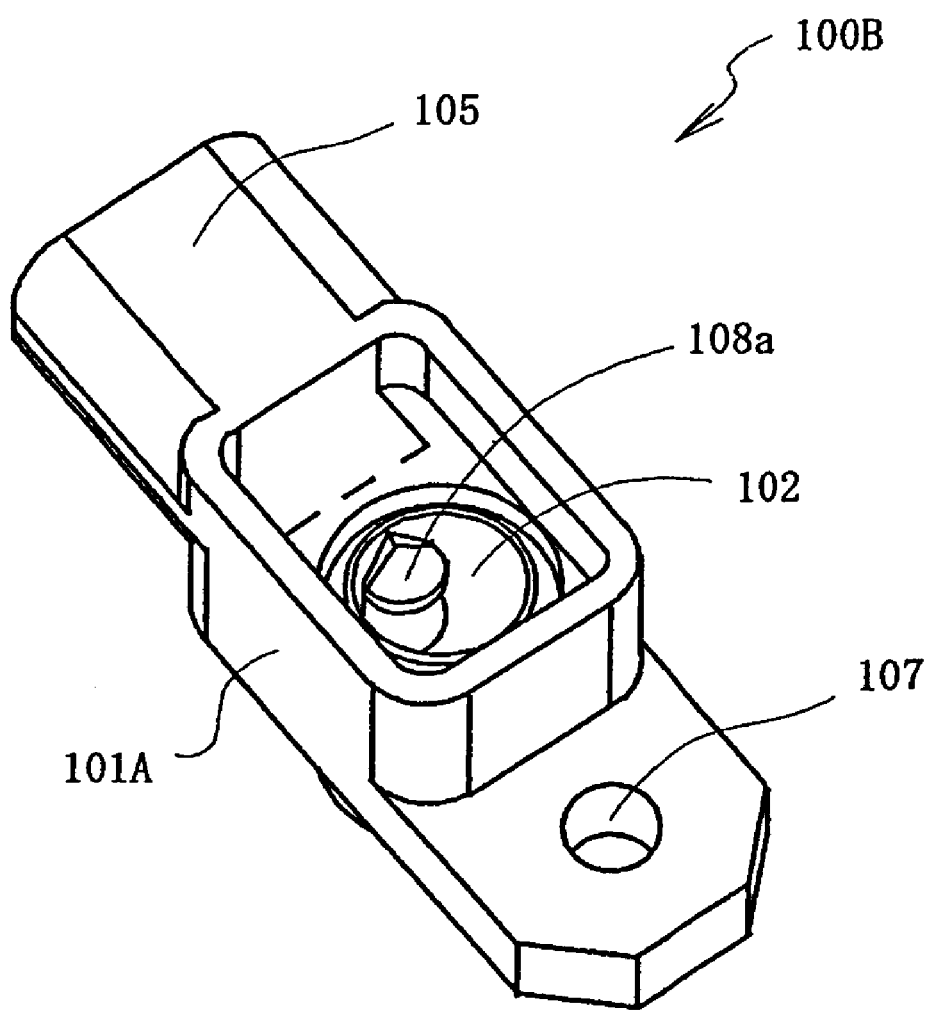
FIG. 3 is a perspective view of a pressure sensor housing according to the embodiment.
Figure 7:
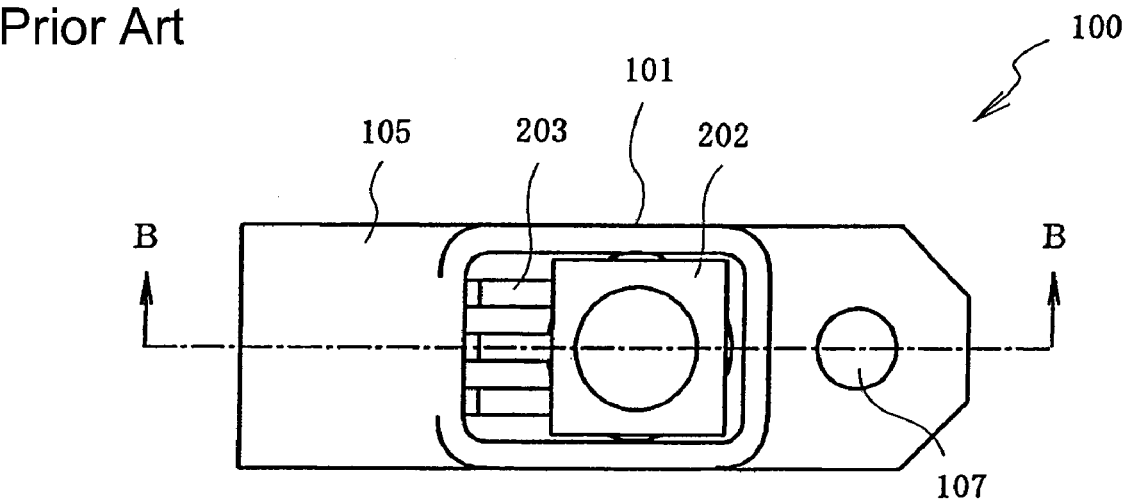
FIG. 7 is a plan view of a conventional pressure sensor apparatus.
Figure 8:
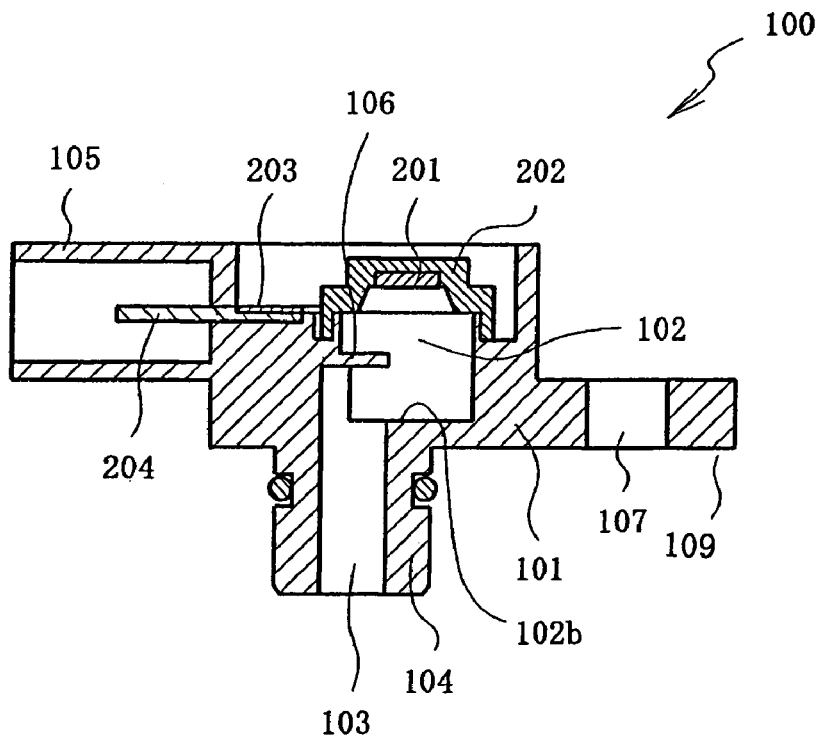
FIG. 8 is a cross-sectional view taken along a line B-B of FIG. 7.
Figure 9:
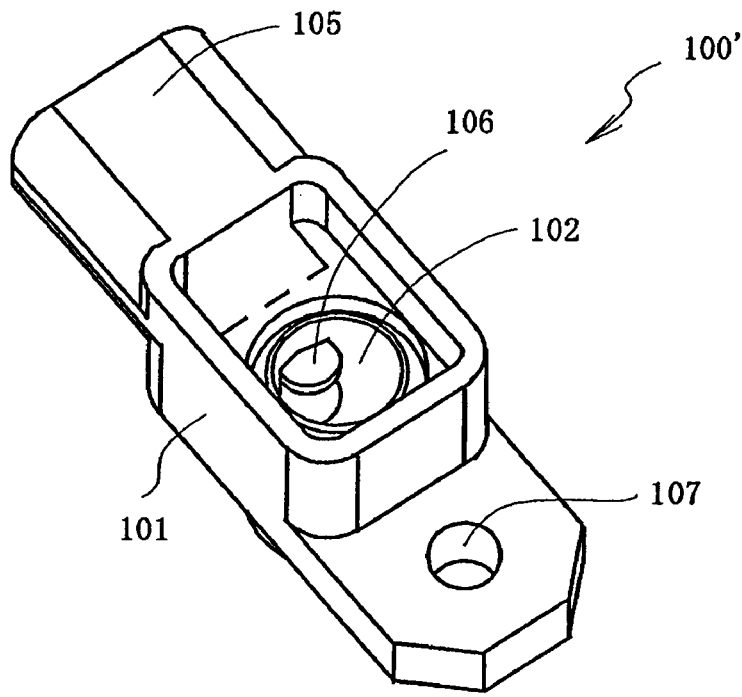
FIG. 9 is a perspective view of a conventional pressure sensor housing.
Figure 10:
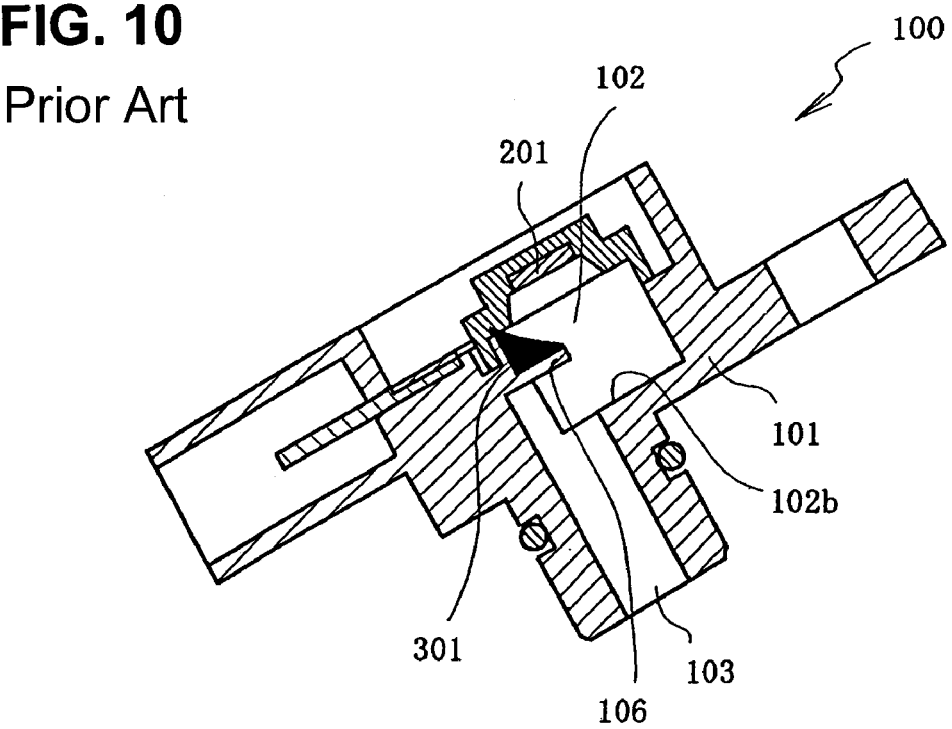
FIG. 10 is a cross-sectional view taken along a line B-B for showing the operation of the conventional technology.

FIG. 1 is a plan view of a pressure sensor apparatus 100A according to the invention. FIG. 2 is a cross-sectional view taken along a line A-A of FIG. 1. FIG. 3 is a perspective view of a pressure sensor housing 100B formed by removing a pressure sensor element 201 and a sensor mount portion 202 from the pressure sensor apparatus 100A. In FIG. 1 through FIG. 3, the same numbers are applied to the components that are the same as those shown in FIG. 7 through FIG. 9, and the different components are mainly described hereinafter.

As shown in FIG. 2 and FIG. 3, a pressure detection chamber 102 is formed in a substantially central part of a sensor housing main body 101A, and a protective wall 108 is provided in a protruding fashion on a part of an inner peripheral side wall of the sensor housing main body 101A. The protective wall 108 has a shape obtained by roughly dividing a circular cone into two parts along the central axis thereof, and arranging one of these parts as the protective wall 108 such that a curved inclined surface 108a faces the side of the pressure sensor element 201 side. Here, the sensor housing main body 101A having the protective wall 108 is integrally formed with resin, but only the protective wall 108 may be formed independently with resin or the like and then adhered or welded to an inner wall of the pressure detection chamber 102. In the illustrated embodiment, only one protective wall 108 is provided, but a plurality of the protective walls 108 may be disposed on the inner peripheral wall of the pressure detection chamber 102, if the volume of the pressure detection chamber 102 is somewhat large and a flow of air coming from the pressure inlet 103 toward the pressure sensor element 201 is not blocked.

Figure 4A:
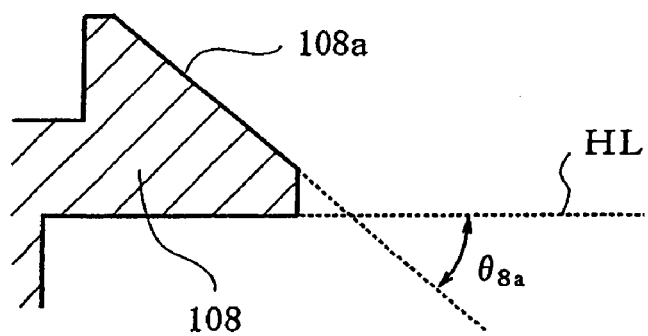
FIG. 4 is an enlarged cross-sectional view of a substantial part showing an operation of the embodiment.
Figure 4B:
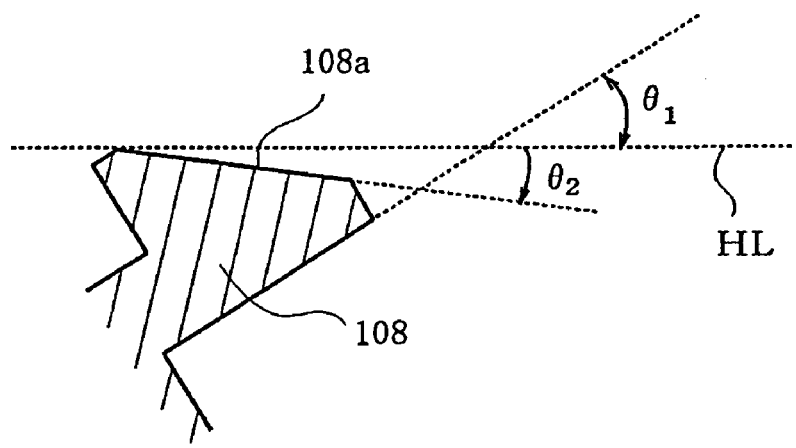

FIG. 4A is an enlarged cross-sectional view showing the protective wall 108 shown in FIG. 2, wherein an inclination angle $\theta_{8a}$ is the angle of the inclined surface 108a with respect to a horizontal line HL in the case in which the pressure sensor apparatus 100A is attached horizontally. The horizontal line HL is a plane that is parallel to the plane in which the seating surface 109 is located. Accordingly, the inclined surface 108a is in a plane that intersects the plane of both the horizontal line HL and the seating surface 109. It is necessary to set the inclination angle $\theta_{8a}$ to the size at which a second angle $\theta_2$ can be acquired between the horizontal line HL and the inclined surface 108a that slopes downward below the horizontal line HL when the pressure sensor apparatus 100A attached to an intake manifold is inclined by a first angle $\theta_1$ with respect to the horizontal line HL, as shown in FIG. 4B. It should be noted that the inclined surface 108a may be curved or flat as in this embodiment. If the inclined surface 108a is curved, the moisture 301 adhering to the inclined surface 108a slips off in multiple directions, whereby the moisture 301 can be more easily removed.

The protective wall 108 functions to prevent oil, dust and other foreign matters from entering the pressure detection chamber 102 from the pressure inlet 103 side and prevents damage and contamination of the pressure sensor element 201, as in the prior art. The protective wall 108 further functions to prevent the accumulation of the moisture by means of the inclined surface 108a. Specifically, even if the pressure sensor apparatus 100A attached to the intake manifold is inclined by the first angle $\theta_1$ as shown in FIG. 4B, the second angle $\theta_2$ is acquired between the horizontal line HL and the inclined surface 108a that slopes downward below the horizontal line HL, thus the moisture adhered to the inclined surface 108a falls downward along the inclined surface 108a.

Figure 5:
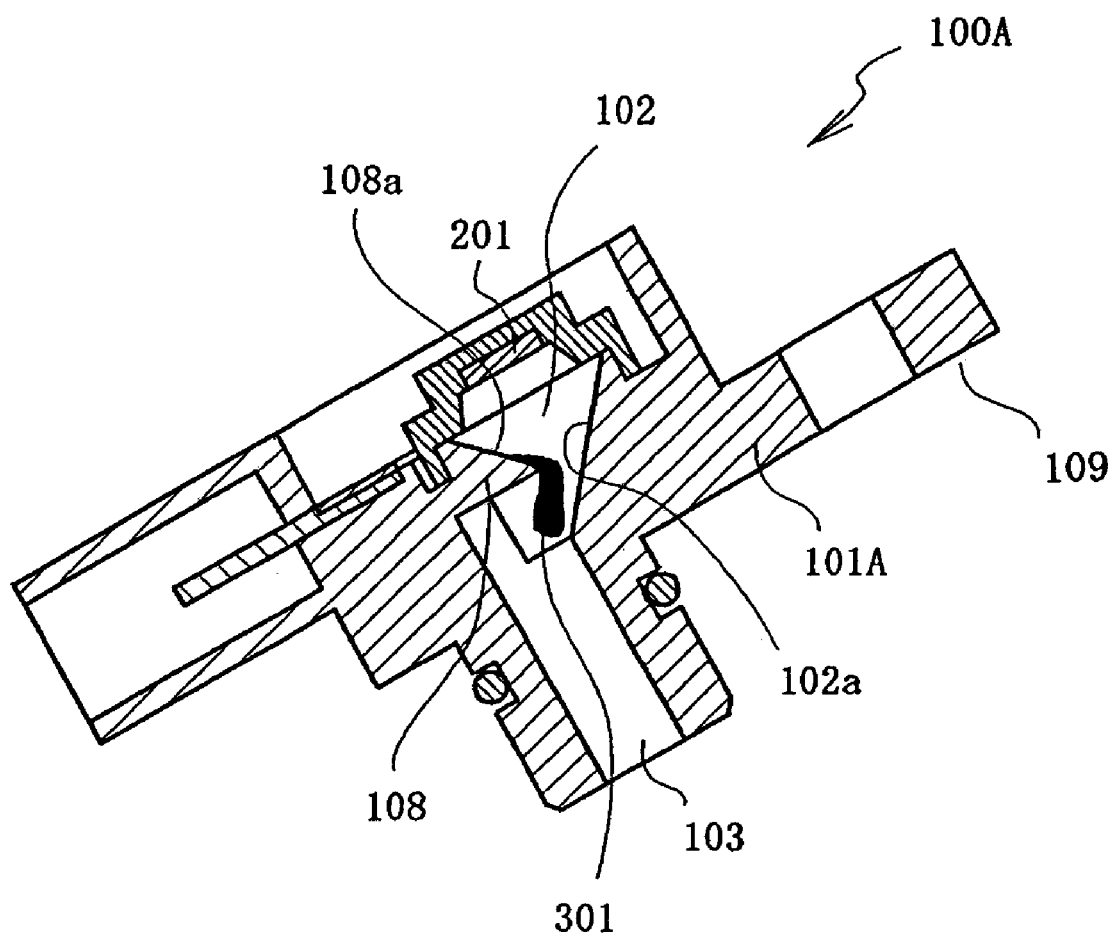
FIG. 5 is a cross-sectional view taken along a line A-A for showing the operation of the embodiment.

FIG. 5 shows a state in which the moisture (water droplet) 301 falls from the inclined surface 108a. The moisture 301 is removed toward the intake manifold side via the pressure inlet 103. The moisture is therefore prevented from accumulating on the top surface of the protective wall 108, and damage of the pressure sensor element 201 caused by frozen moisture 301 and the increase of a resistance of an air passage can be prevented. Moreover, when not only moisture but also oil or gasoline adheres to the inclined surface 108, the oil and gasoline slip off along the inclined surface 108a and falls downward, as with the moisture. Therefore, the gel-like coating member for coating the pressure sensor element and the like can be prevented from swelling so that the coating effect is not damaged, and insulation degradation or corrosion of the pressure sensor element can be prevented.

Furthermore, as is clear from FIG. 2 and FIG. 5, in this embodiment another inclined surface 102a is formed on the inner peripheral wall of the pressure detection chamber 102 opposite to the inclined surface 108a. This inclined surface 102a may be flat, but by forming a curved inclined surface 102a in the shape of, for example, a bowl, moisture, oil, gasoline or the like adhered to the inclined surface 102a slips off in a multiple directions and is smoothly removed. The inclined surface 102a in cross-section lies in a plane that also intersects the plane containing the horizontal line HL and the plane of the seating surface 109. In addition, the plane containing the inclined surface 102a intersects with the plane containing the inclined surface 108a in a location within the pressure detection chamber 102.

Figure 6A:
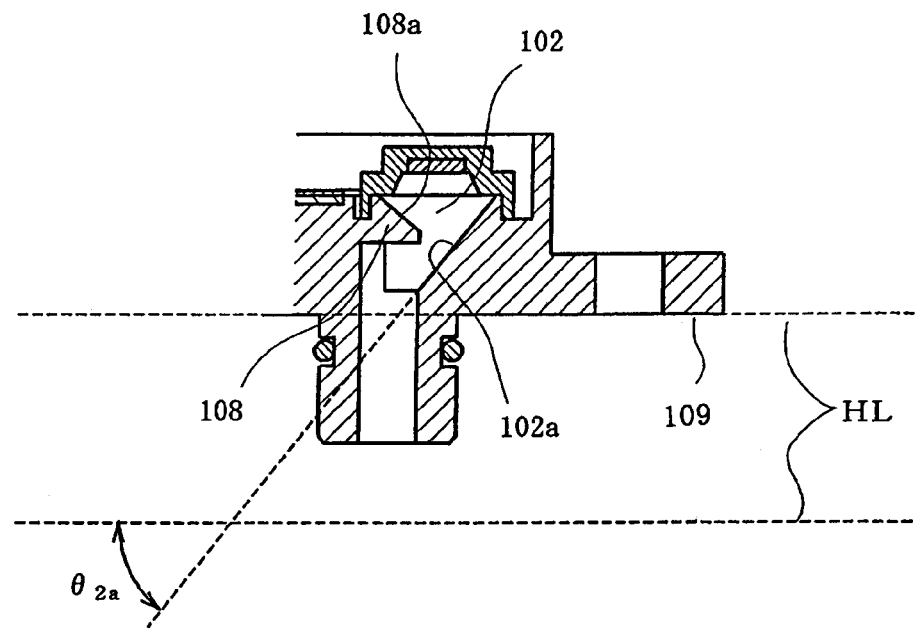
FIG. 6 is a cross-sectional view of a substantial part showing the operation of the embodiment.

FIG. 6A is a cross-sectional view for explaining an operation of the inclined surface 102a shown in FIG. 2 and FIG. 5, wherein an inclination angle $\theta_{2a}$ is the angle of the inclined surface 102a with respect to the horizontal line HL when the pressure sensor apparatus 100A is attached horizontally. It is necessary to set the inclination angle $\theta_{2a}$ to the size at which a fourth angle $\theta_4$ can be acquired between the horizontal line HL and the inclined surface 102a that slopes downward below the horizontal line HL when the pressure sensor apparatus 100A attached to the intake manifold is inclined by a third angle $\theta_3$ with respect to the horizontal line HL, as shown in FIG. 6B.

Figure 6B:
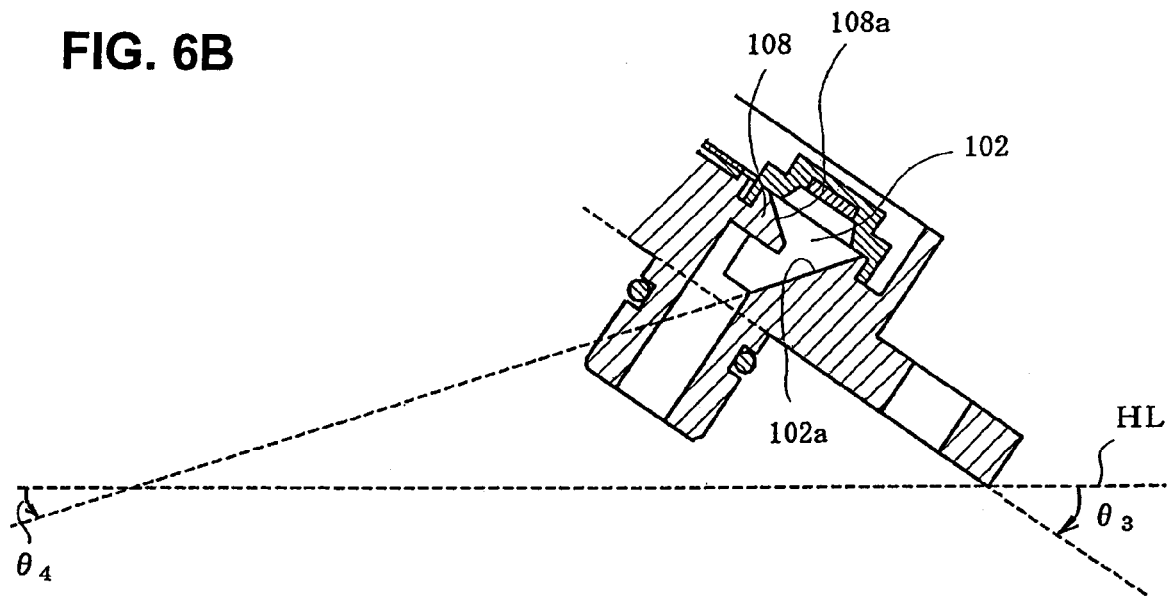

By such a structure, even if the pressure sensor apparatus 100A attached to the intake manifold is inclined by the third angle $\theta_3$ as shown in FIG. 6B, the fourth angle $\theta_4$ is acquired between the horizontal line HL and the inclined surface 102a that slopes downward below the horizontal line HL. Therefore, the moisture, oil, gasoline or the like adhered to the inclined surface 102a slips off along the inclined surface 102a and falls downward, whereby the operational effect same as that of the inclined surface 108a of the protective wall 108 can be obtained. It should be noted that each of the first through fourth angles may be of any size as long as the first and third angles are equal to or greater than zero degrees and the second and fourth angles are greater than zero degrees.

The invention has been described with reference to certain preferred embodiments thereof, but it will be understood that variations and modifications are possible within the scope of the appended claims. For example, the above described embodiments describe a pressure sensor apparatus that is attached to the intake manifold, but the invention is not limited to a sensor for detecting pressure within an intake manifold. Instead, the invention may be employed in a variety of applications to sense gas pressure, either air or any other gas, within a chamber. Still further, the present invention can be applied not only to the pressure sensor apparatus 100A having the pressure sensor element 201, but also to the pressure sensor housing 100B configured such that the pressure sensor element 201 can be mounted therein as shown in FIG. 3. Specifically, if a pressure sensor housing having the inclined surface 108a of the protective wall 108 or the inclined surface 102a of the inner peripheral wall of the pressure detection chamber 102 is used as the pressure sensor housing for using the sensor mount portion 202 to mount the pressure sensor element 201, the effect of preventing the accumulation of moisture, oil, gasoline and the like can be obtained, as in the above-described pressure sensor apparatus 100A. Other variations and modifications are possible.

What is claimed is:

1. An apparatus comprising:
   a sensor housing main body including a seating surface;
   a pressure detection chamber located within the sensor housing main body; and
   a protective wall protruding from an inner peripheral side wall of the sensor housing main body into the pressure detection chamber;
   wherein the protective wall has a first inclined surface located in a plane that intersects with a plane in which the seating surface is located; and wherein a second inclined surface is formed on an inner peripheral side wall of the pressure detection chamber, and the second inclined surface lies in a plane that intersects the plane containing the seating surface.

2. The apparatus according to claim 1, wherein the sensor housing main body and the protective wall are integrally formed with resin.

3. The apparatus according to claim 1, wherein the first inclined surface is a curved surface.

4. The apparatus according to claim 1, wherein the plane in which the second inclined surface lies intersects the plane containing the first inclined surface at a location within the pressure detection chamber.

5. The apparatus according to claim 1, wherein the second inclined surface is a curved surface.

6. The pressure sensor apparatus according to claim 1, further comprising a pressure sensor element coupled to the sensor housing main body and located in a position to detect the pressure within the pressure detection chamber.

7. An apparatus comprising:
a pressure chamber containing a gas under pressure; and
a pressure sensor mounted on the pressure chamber such that a seating surface of the pressure sensor is inclined with respect to a horizontal line, the pressure sensor including a pressure detection chamber into which gas from the pressure chamber is introduced, a protective wall that prevents entry of a foreign matter into the pressure detection chamber, and a pressure sensor element that measures pressure of the gas introduced into the pressure detection chamber;

wherein the protective wall has first inclined surface, and an inclination angle of the first inclined surface is set to a value at which a second angle is acquired between the horizontal line and the inclined surface that slopes downward when the seating surface of the pressure sensor is disposed obliquely by a first angle with respect to the horizontal line; and wherein a second inclined surface is formed on an inner peripheral wall of the pressure detection chamber, and an inclination angle of the second inclined surface is set to a value at which a fourth angle is acquired between the horizontal line and the second inclined surface that slopes downward when the seating surface of the pressure sensor housing is disposed obliquely by a third angle with respect to the horizontal line.

8. The apparatus according to claim 7, further comprising a sensor housing main body in which the pressure detection chamber is formed therein and which is capable of accommodating the pressure sensor element, wherein the sensor housing main body and the protective wall are integrally formed with resin.

9. The apparatus according to claim 7, wherein the protective wall is provided in a protruding fashion in the pressure detection chamber.

10. The apparatus according to claim 7, wherein the first inclined surface is a curved surface.

11. The apparatus according to claim 7, wherein the second inclined surface is a curved surface.

* * * * *